United States Patent [19]

Brown et al.

[11] 3,922,443

[45] Nov. 25, 1975

[54] PROCESS FOR COATING A SUBSTRATE WITH A POLYSILOXANE COMPOSITION

[75] Inventors: Douglas Arthur Brown; William David Garden, both of Manchester, England

[73] Assignee: Imperial Chemical Industries Limited, London, England

[22] Filed: Jan. 30, 1974

[21] Appl. No.: 437,878

Related U.S. Application Data

[62] Division of Ser. No. 355,732, April 30, 1973, abandoned.

[30] Foreign Application Priority Data

May 1, 1972 United Kingdom............... 20041/72

[52] U.S. Cl. ............ 428/447; 260/2.5 S; 260/46.56; 260/825; 427/44; 427/54; 427/387; 427/388; 427/391; 427/392; 428/450; 428/451; 428/452

[51] Int. Cl.$^2$.... B05D 3/06; B05D 3/02; B32B 9/04; B32B 9/06

[58] Field of Search .... 117/93.31, 132 BS, 138.8 E, 117/138.8 F, 145, 155 R, 161 ZA; 260/46.56, 2.5 S, 825; 427/44, 54, 387, 388, 391, 392; 428/447, 450, 451, 452

[56] References Cited

UNITED STATES PATENTS

| | | | |
|---|---|---|---|
| 2,985,545 | 5/1961 | Leavitt | 117/143 |
| 3,070,555 | 12/1962 | Brumer | 260/825 X |
| 3,338,847 | 8/1967 | Nitzsche et al. | 260/2.5 |
| 3,458,469 | 7/1969 | Murphy | 260/37 |
| 3,527,659 | 9/1970 | Keil | 117/145 |
| 3,527,842 | 9/1970 | Clark | 260/825 |
| 3,726,710 | 4/1973 | Berger et al. | 117/93.31 |
| 3,746,567 | 7/1973 | Nordstrom | 117/93.31 |

*Primary Examiner*—Michael R. Lusignan
*Attorney, Agent, or Firm*—Cushman, Darby & Cushman

[57] ABSTRACT

A process for rendering a surface of a substrate abhesive by applying a coating composition consisting essentially of 80 to 99 parts by weight hydroxy ended polysiloxane of viscosity not greater than 5000 cP at 20°C, 1 to 20 parts by weight organohydrogenpolysiloxane of viscosity less than 5000 cP at 20°C and up to 0.1 part by weight of platinum catalyst per 100 parts by weight total polysiloxanes.

10 Claims, No Drawings

PROCESS FOR COATING A SUBSTRATE WITH A POLYSILOXANE COMPOSITION

This is a division of application Serial No. 355,732, filed April 30, 1973, now abandoned.

This invention relates to a process for rendering the surfaces of substrates abhesive and more particularly to such a process using compositions based on organopolysiloxanes.

A wide variety of compositions based on organopolysiloxanes are known and have been used for coating substrates such as paper, and film materials such as polyolefin, polyester and regenerated cellulose films, metal foils and the like, to render them abhesive. A disadvantage of these compositions has been the necessity to employ a solvent to enable the composition to be readily applied to the substrate.

According to the present invention, a process for rendering the surfaces of substrates abhesive comprising applying to a substrate composition consisting essentially of 80 to 99 parts by weight of a hydroxy-ended diorganopolysiloxane of viscosity not greater than 1000 cP at 20°C, 1 to 20 parts by weight of an organohydrogenpolysiloxane of viscosity not greater than 100 cP at 20°C both per 100 parts by weight of total polysiloxanes and from 0.001 up to 0.1 part by weight, calculated as platinum, of a catalyst selected from the group consisting of complexes of halides of platinum metals with a ligand or donor group, per 100 parts by weight of total polysiloxanes and thereafter curing the coating to an abhesive film by heating.

While the diorganopolysiloxane may be used in amount from 80 to 99 parts it is generally preferred that it be used in amount from 90 to 99 parts. It is also frequently preferred that the viscosity of the diorganopolysiloxane be from 20 to 1000 cP 20°C.

The organo groups in the diorganopolysiloxane may be alkyl, aryl, alkaryl, aralkyl, alkenyl, cycloalkyl or cycloalkenyl groups. Suitable groups include methyl, ethyl, propyl, butyl, phenyl, vinyl, tetrachlorophenyl, trifluoromethyl, trifluoropropyl and cyclohexyl groups. Any unsaturated groups present should not form more than 10 per cent of the total organo groups. In general, it is preferred that the organo groups be methyl groups. The diorganopolysiloxane may contain hydroxy groups in addition to the two terminal hydroxy groups.

While the organohydrogenpolysiloxane may be used in amounts from 1 to 20 parts by weight it is normally preferred to use from 1 to 10 parts.

It is also in general preferred that the viscosity of the organohydrogenpolysiloxane be from 10 to 100 cP at 20°C. The organo groups in the organohydrogenpolysiloxane may be the same as those in the diorganopolysiloxane. It is also preferred that they be methyl groups. The proportion of hydrogen in the organohydrogenpolysiloxane may vary widely, for example, from an H/Si ratio of 1:10 to 1:1. In general it is preferred that the organohydrogen polysiloxane consists of a chain of organohydrogensiloxy units.

The catalysts used herein are the complexes of the halides of a platinum metal i.e. iridium, osmium, palladium, platinum, rhodium or ruthenium with a ligand or donor group. Suitable ligand or donor groups include groups containing arsenic, phosphorus, sulphur, or nitrogen, or an olefin, which coordinate with the metal. Suitable ligands include, for example, the hydrocarbyl arsines, phosphines and sulphides such as tripropyl arsine, tributylphosphine, phenyl diethyl phosphine, diethyl sulphide or phenylmercaptan, amines such as ethylenediamine, ammonia or pyridine, nitriles such as benzonitrile and olefins such as ethylene, cyclohexene, hexa-1:5-diene,2-dimethyl-5-methylhex-3-yne, cyclopentene and cyclooctadiene. Suitable complexes include, for example,

| | |
|---|---|
| dichloro-cyclooctadiene platinum (II) | $C_8H_{12}PtCl_2$ |
| dichloro-bis(tripropylphosphine)-μ-dichlorodiplatinum | $[(C_3H_7)_3PtCl_2]_2$ (II) |
| dichloro-bis(tripropylphosphine)-μ-bis(diphenylphosphine) diplatinum (II) | $[(C_3H_7)_3P\ Pt\ P(C_6H_5)_2Cl]_2$ |
| diphenyl-bis(tripropylphosphine)-μ dibromodiplatinum (II) | $[(C_3H_7)_3P\ Pt(C_6H_5)Br]_2$ |
| bis(diethylsulphide)-dichloroplatinum (II) | $[(C_2H_5)_2S]_2PtCl_2$ |
| dichlorodicyclohexene-μ-dichloro diplatinum (II) | $[C_6H_{10}PtCl_2]_2$ |
| bis(benzonitrile)dichloroplatinum (II) | $(C_6H_5CN)_2PtCl_2$ |
| ethylenediamine tetrachloroplatinum (IV) | $(NH_2C_2H_4NH_2)PtCl_4$ |
| hexa-1:5-diene aminochlororhodium | $C_6H_{10}(NH_3)RhCl$ |
| dichloro-bis(triethylphosphine)-μ-dichlorodipalladium | $[(C_2H_5)_3PPdCl_2]_2$ |

It is normally preferred that the halide be chlorine and that the metal be platinum. Such complexes can be prepared by the methods described, for example, by Kharasch, J.A.C.S. 1936, 58, 1733, MacNevin, Giddings and Foris, Chemistry and Industry 1958, 557 or in "Inorganic Synthesis" Vol. 6, Page 211 (McGraw Hill, New York 1960:Ed. Rochow).

The platinum catalyst may be used as stated in an amount from 0.001 to 0.1 part by weight (calculated as platinum) per 100 parts by weight of total polysiloxanes. It is, however, in general preferred to use from 0.001 to 0.05 part per 100 parts by weight of total polysiloxanes.

The process of our invention is suitable for substrates such as, for example, paper, a synthetic or natural film or a metal foil. It is especially useful, however, for the coating of paper.

The coating may be carried out by any of the known methods, for example, such as knife coating, roll coating, reverse roll coating, by gravure cylinder or spraying. The compositions may be applied in widely varying amounts, for example, up to 10g/m². In many cases amounts of from 0.5 to 5 g/m² are preferred.

After coating the composition is cured by heating by any convenient method or by ultra-violet or ionising irradiation. Such methods include, for example, oven, hot air and infra-red heating.

The absence of solvent in the compositions used in the process of our invention allows coatings to be cured with a much lower heat input. It also, of course, avoids the fire and explosion hazards necessarily associated with the removal of solvents. In addition, the catalysts used allow curing to take place by ultra-violet radiation which compared, for example, with infra-red radiation requires less power and a lower operating voltage and gives a cure at a lower temperature.

Our invention is further illustrated by the following examples in which all parts and percentages are by weight.

EXAMPLE 1

100 parts of hydroxy-ended dimethylpolysiloxane of viscosity 940 cP at 20°C were mixed with 4 parts of a methylhydrogenpolysiloxane of viscosity 20 cP at 20°C and 2 parts of a catalyst solution prepared by dissolving 2 parts of bis(diethyl sulphide)dichloroplatinum in 98 parts of toluene.

The so prepared polysiloxane composition had initially a viscosity of 740 cP at 20°C and after 3 hours had a viscosity of 930 cP at 20°C. This composition was coated onto paper using a wire-wound rod at 6 g/m$^2$ and cured in a hot air oven at a temperature of 120°C for 0.75 minute. The composition cured to a smear-free solid with good adhesion to the paper. To determine the anti-adherent or abhesive properties of the cured polysiloxane a strip of Quality T24 Tak-strip (manufactured by Samuel Jones & Co. Ltd) was pressed against it under a load of 70 g/cm$^2$ for 20 hours at 20°C and then peeled from it at a speed of 30 cm/minute: the force required to peel the Takstrip was 27 g/inch. In a similar test on paper which was not coated with the polysiloxane composition the force required to peel the Takstrip was 330 g/inch width.

For purposes of comparison a polysiloxane composition identical except that it was catalysed with 2 parts of a solution prepared by dissolving 50 parts of dibutyltin diacetate in 50 parts of toluene was prepared. This had the same initial viscosity but became viscous and gelled within 20 minutes. The composition when applied to paper and cured in the manner described took the same time to cure. The rapid rate of gelation of the composition would, however, preclude its commercial use to manufacture abhesive coatings.

EXAMPLE 2

A catalysed polysiloxane composition prepared in the same way as in Example 1 was coated onto paper using a flexible doctor blade at 4 g/sq.m. The coating was cured to a smear-free solid with good adhesion to the paper but good anti-adherent properties to Quality T24 Takstrip by exposing it for 1.5 minutes to the radiation from an ultra-violet mercury strip lamp placed 2 inches from the coated paper. The voltage drop across the U.V. lamp was 24 volts, the current was 6 amps and the power consumption 144 watts. The temperature to which the coating had risen on exposure to the U.V radiation was assessed by sprinkling powdered wax compositions of known melting point on paper and exposing this paper to the same amount of U.V. radiation as was applied to the coated paper. On this test wax, m.p. 101°C, just melted.

EXAMPLE 3

A catalysed polysiloxane composition was coated onto paper as in Example 2 and exposed to radiation from an infra-red strip lamp for 1.5 minutes so as to give the same degree of cure to the coating as was obtained in Example 2. The infra-red strip lamp was placed 2 inches from the coated paper. The voltage drop across the lamp was 120 volts, the current was 3 amps and the power consumption 360 watts. The temperature to which the coating had risen was assessed as in Example 2. On this test wax m.p. 121°C, just melted.

We claim:

1. A process for rendering the surfaces of substrates abhesive comprising applying to a substrate an essentially solventfree composition consisting essentially of 80 to 99 parts by weight of a hydroxy-ended diorganopolysiloxane of viscosity not greater than 1000cP at 20°C, 1 to 20 parts by weight of an organohydrogenpolysiloxane of viscosity not greater than 100 cP at 20°C both per 100 parts by weight of total polysiloxanes and from 0.001 to 0.1 part by weight calculated as platinum, of a catalyst selected from the group consisting of complexes of halides of platinum metals with a ligand or donor group, per 100 parts by weight of total polysiloxanes and thereafter curing the coating to an abhesive film by heating.

2. A process according to claim 1 wherein the diorganopolysiloxane is used in amount from 90 to 99 parts by weight and the organohydrogenpolysiloxane is used in amount from 1 to 10 parts by weight.

3. A process coating according to claim 1 wherein the organo groups present in the polysiloxane are selected from the group consisting of alkyl, aryl, alkaryl, aralkyl, alkenyl, cycloalkyl and cycloalkenyl groups, not more than 10 per cent of the total organo groups being unsaturated groups.

4. A process according to claim 1 wherein the proportion of hydrogen in the organohydrogenpolysiloxane is such that the H/Si ratio is from 1:10 to 1:1.

5. A process according to claim 1 wherein the halide in the catalyst is chloride.

6. A process according to claim 1 wherein the platinum metal in the catalyst is platinum.

7. A process according to claim 1 wherein the catalyst is used in amount from 0.001 to 0.05 part per 100 parts by weight of total polysiloxanes.

8. A process according to claim 1 wherein the substrate is selected from the group consisting of paper, polyolefin film, polyester film, regenerated cellulose film and metal foils.

9. A process according to claim 3 wherein the organo groups are selected from the group consisting of methyl, ethyl, propyl, butyl, phenyl, vinyl, tetrachlorophenyl, trifluoroethyl, trifluoropropyl and cyclohexyl groups.

10. Substrates coated by the process claimed in claim 1.

* * * * *